(12) United States Patent
Salter et al.

(10) Patent No.: US 10,047,659 B2
(45) Date of Patent: Aug. 14, 2018

(54) PHOTOLUMINESCENT ENGINE INDICIUM

(71) Applicant: Ford Global Technologies, LLC, Dearborn, MI (US)

(72) Inventors: Stuart C. Salter, White Lake, MI (US); Paul Kenneth Dellock, Northville, MI (US); Talat Karmo, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 15/252,343

(22) Filed: Aug. 31, 2016

(65) Prior Publication Data

US 2018/0058298 A1    Mar. 1, 2018

(51) Int. Cl.
| | | |
|---|---|---|
| *F01N 5/02* | (2006.01) | |
| *F01N 13/00* | (2010.01) | |
| *F01N 13/10* | (2010.01) | |
| *G09F 3/00* | (2006.01) | |
| *G09F 13/20* | (2006.01) | |
| *G01J 5/08* | (2006.01) | |
| *B82Y 20/00* | (2011.01) | |
| *B82Y 40/00* | (2011.01) | |

(52) U.S. Cl.
CPC ......... *F01N 13/008* (2013.01); *F01N 13/102* (2013.01); *G01J 5/08* (2013.01); *G09F 3/0294* (2013.01); *G09F 13/20* (2013.01); *B82Y 20/00* (2013.01); *B82Y 40/00* (2013.01); *Y10S 977/774* (2013.01); *Y10S 977/813* (2013.01); *Y10S 977/892* (2013.01); *Y10S 977/95* (2013.01); *Y10S 977/955* (2013.01)

(58) Field of Classification Search
CPC .... F01N 13/008; F01N 13/102; F01N 13/082; F01N 5/02; F01N 5/025; F01N 5/00; G01J 5/08; G09F 3/0294; G09F 13/20; B82Y 20/00; B82Y 40/00; Y10S 977/774; Y10S 977/813; Y10S 977/892; Y10S 977/95; Y10S 977/955; F21K 2/005; B60Q 1/26; B60Q 1/0023; B60Q 1/0094; B60Q 1/2688; B60Q 1/2696; H01L 35/30; H01L 35/32; G02B 6/0005
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Anh Mai
*Assistant Examiner* — Fatima Farokhrooz
(74) *Attorney, Agent, or Firm* — Jason Rogers; Price Heneveld LLP

(57) ABSTRACT

A vehicle engine is provided that includes an exhaust manifold configured to emit a first emission. A heat shield is positioned proximate the exhaust manifold and has a shield substrate defining an aperture. An indicator is positioned over the aperture with a support substrate and a semiconductor layer. The semiconductor layer is configured to absorb the first emission and emit a second emission.

20 Claims, 3 Drawing Sheets

(56) References Cited

U.S. PATENT DOCUMENTS

| | | |
|---|---|---|
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,030,624 B2 | 10/2011 | Kalish et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0268714 A1 | 11/2007 | Chen et al. |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2008/0245590 A1* | 10/2008 | Yonak .................. B60K 6/48 180/165 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0303940 A1 | 12/2011 | Lee et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0238005 A1* | 8/2014 | Bewlay .................. F01N 5/025 60/320 |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0160454 A1 | 6/2015 | Bhakta |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 203269284 | 11/2013 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 202011109169 | 5/2012 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |

(56) References Cited

FOREIGN PATENT DOCUMENTS

| WO | 2006047306 A1 | 5/2006 |
|----|---------------|--------|
| WO | 2014068440 A1 | 5/2014 |
| WO | 2014161927 A1 | 10/2014 |

\* cited by examiner

PHOTOLUMINESCENT ENGINE INDICIUM

FIELD OF THE INVENTION

The present disclosure generally relates to vehicle appliques, and more particularly, to lighting systems and appliques for automotive vehicles having photoluminescent features.

BACKGROUND OF THE INVENTION

Illumination systems used in vehicles may offer a unique and attractive viewing experience. It is therefore desired to incorporate such illumination systems in portions of vehicles to provide accent and functional lighting.

SUMMARY OF THE INVENTION

According to one aspect of the present invention, a vehicle engine is provided that includes an exhaust manifold configured to emit a first emission. A heat shield is positioned proximate the exhaust manifold and has a shield substrate defining an aperture. An indicator is positioned over the aperture. The indicator includes a support substrate and a semiconductor layer. The semiconductor layer is configured to absorb the first emission and emit a second emission.

According to another aspect of the present invention, a vehicle is provided that includes an engine component configured to emit a first emission having a wavelength greater than about 800 nm and a heat shield positioned proximate the engine component. An indicator is positioned on the heat shield and configured to absorb the first emission and emit a second emission.

According to yet another aspect of the present invention, a vehicle engine is provided that includes an exhaust manifold configured to emit a first emission and a heat shield positioned proximate the exhaust manifold. A semiconductor layer is positioned proximate the heat shield and configured to convert the first emission into a second emission.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
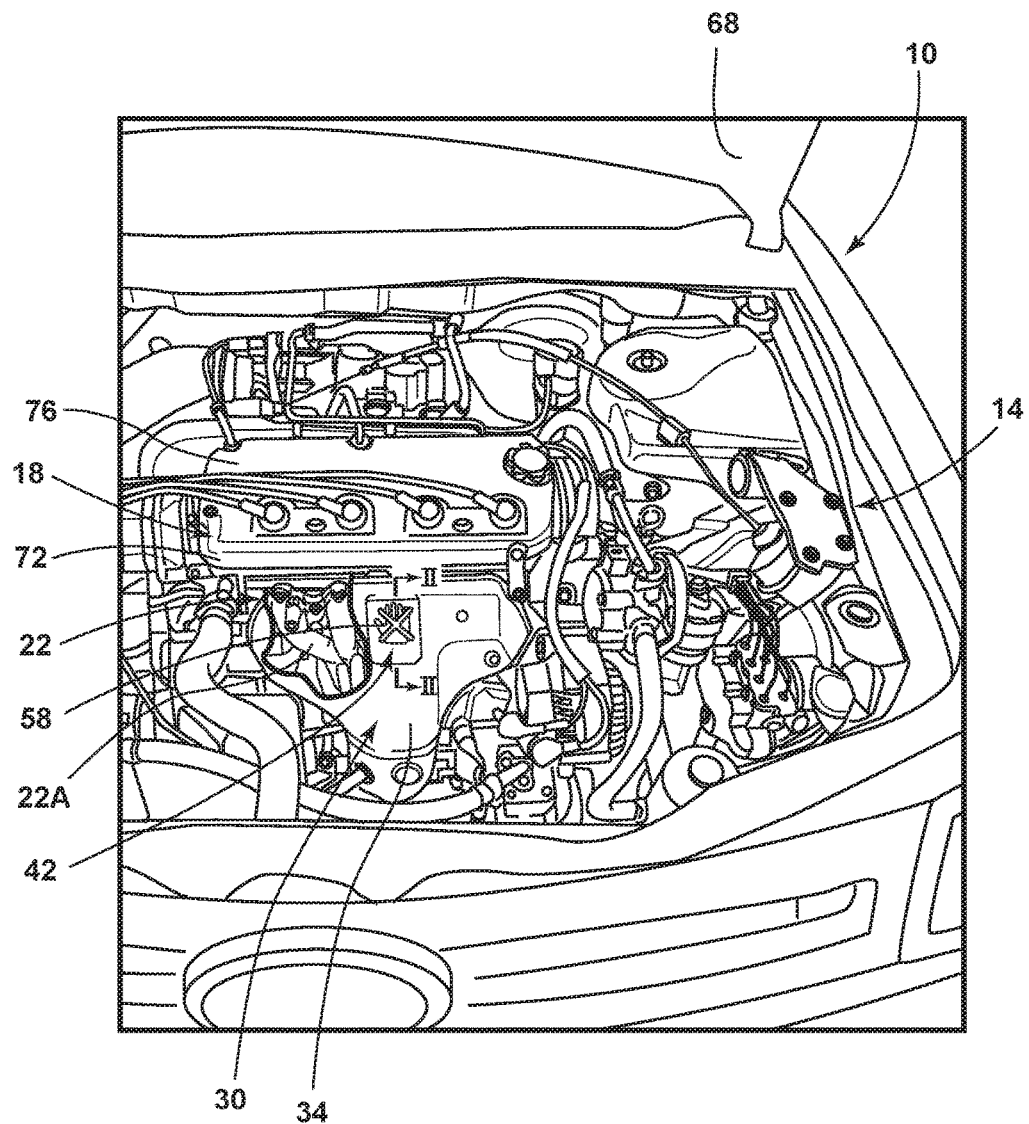
FIG. 1 is front perspective view of a vehicle engine compartment, according to one embodiment.
Figure 2:
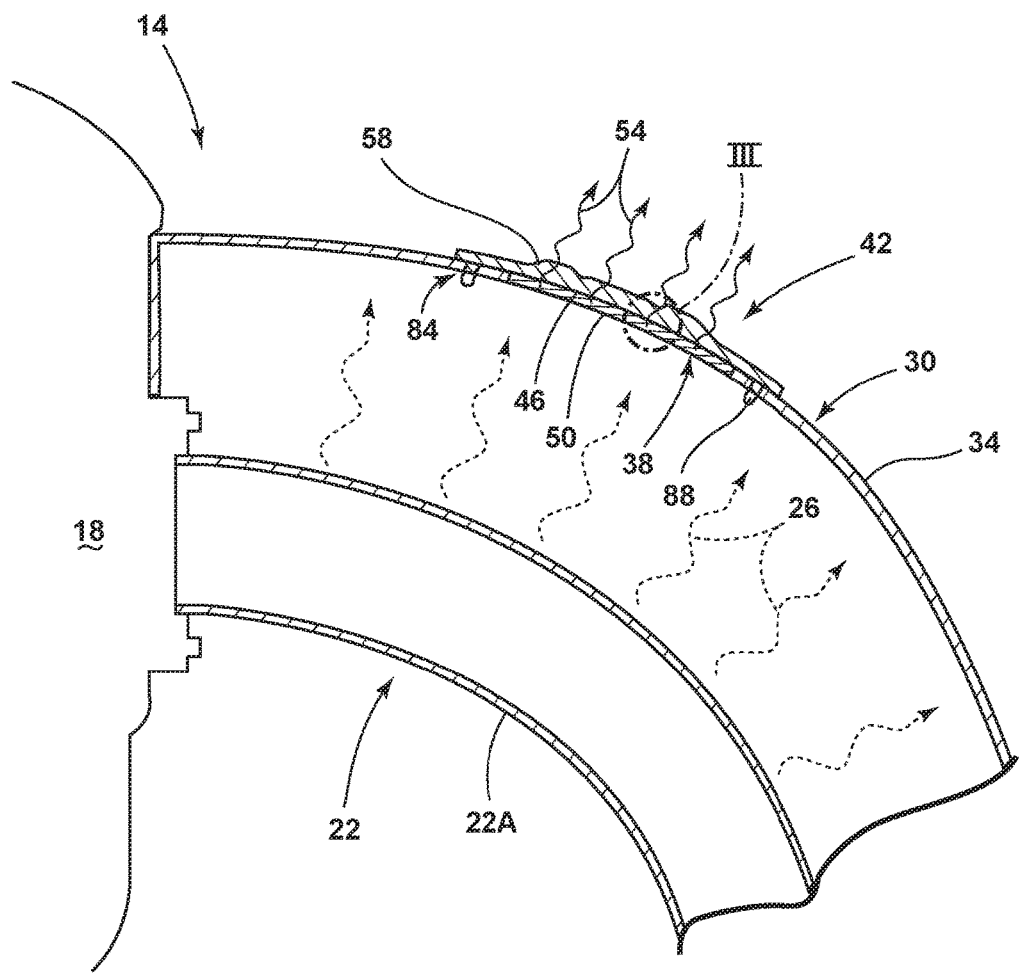
FIG. 2 is a cross-sectional view taken along line II of FIG. 1.
Figure 3:
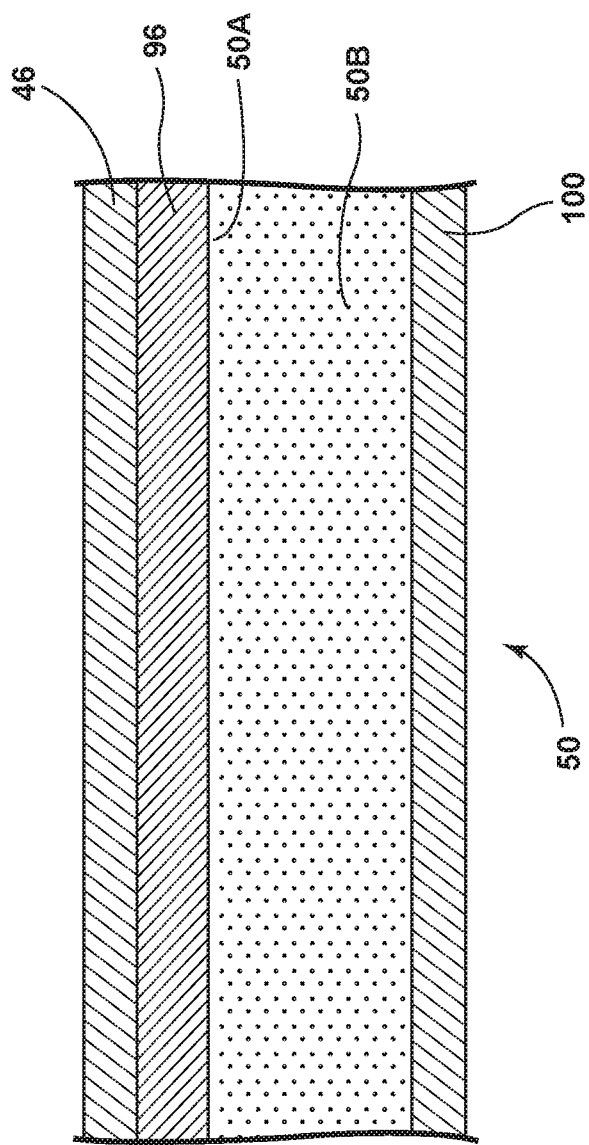
FIG. 3 is an enhanced view taken at section III of FIG. 2.

Referring to FIGS. 1-3, depicted is a vehicle 10 having an engine compartment 14 with an engine 18 disposed therein. The engine 18 includes an exhaust manifold 22. As explained in greater detail below, the exhaust manifold 22 may be configured to emit a first emission 26. A heat shield 30 is positioned proximate the exhaust manifold 22. The heat shield 30 includes a shield substrate 34 which defines an aperture 38. An indicator 42 is positioned on the heat shield 30. The indicator 42 includes a support substrate 46 and a semiconductor layer 50. As explained in greater detail below, the semiconductor layer 50 may be configured to absorb the first emission 26 and emit a second emission 54. In other words, the semiconductor layer 50 is configured to convert the first emission 26 into the second emission 54. The indicator 42 may define an indicium 58 which is configured to be illuminated by the second emission 54.

Referring now to FIG. 1, the vehicle 10 includes a hood 68 operable between an open and closed position. The hood 68, when in the open position, allows access to the engine compartment 14, and when closed, resists humans and the environment from reaching the engine 18. As explained above, the engine 18 is positioned within the engine compartment 14. The engine 18 includes a variety of engine components such as the exhaust manifold 22, an engine block 72, a cylinder head 76, and other components positioned on and around the engine 18 which may reach an elevated temperature during use of the vehicle 10.

In operation, the engine 18 is configured to provide a locomotive force to the vehicle 10 by combusting fuel and oxygen within the engine 18. Combustion of the fuel and oxygen leads to the generation of exhaust gases and heat which is absorbed by the various engine components on the engine 18. For example, the heated exhaust from the combustion transfers heat to the exhaust manifold 22. The exhaust manifold 22 is configured to carry the exhaust gas stream away from the engine 18 and towards an emissions system of the vehicle 10. As the exhaust gases pass through the exhaust manifold 22, the exhaust manifold 22 will absorb heat from the exhaust gases. In the depicted embodiment, the exhaust manifold 22 includes a plurality of exhaust tubes 22A which are coupled (e.g., bolted) to the engine 18. The exhaust tubes 22A extend outward from the engine 18 and then, in the depicted embodiment, travel downwards below the engine 18 through the engine compartment 14. As explained above, the exhaust manifold 22, and the exhaust tubes 22A, may absorb the heat from the exhaust gases and become hot. In the depicted embodiment, the heat shield 30 is positioned over the exhaust manifold 22, but it will be understood that the heat shield 30 may be positioned on the side of, below, above, in front of, or otherwise proximate to the exhaust manifold 22. The heat shield 30 is configured to block and or prevent objects within the engine compartment 14 (e.g., hoses, wires, human appendages) from inadvertently contacting the exhaust manifold 22 and becoming damaged by the heat. Further, the heat shield 30 may be positioned to block the first emission 26 which radiates from the heated exhaust manifold 22. In other words, the heat shield 30 may be used to prevent the radiative heating of the engine compartment 14.

The exhaust manifold 22 may reach temperatures between the ambient temperature around the vehicle 10 (e.g., before the vehicle 10 has started) to upwards of 800° C. (e.g., after prolonged or intense operation of the vehicle 10 and engine 18). According to various embodiments, the first emission 26 is a thermal radiation generated by the heating of the exhaust manifold 22. As the temperature of the exhaust manifold 22 increases (e.g., due to an increase in revolutions-per-minute of the engine 18 and/or increased running time of the engine 18) the wavelength of the first emission 26 may change. For example, the first emission 26 may be an emission in the infrared band (e.g., having a wavelength of between about 700 nm and about 1 mm). As the temperature of the exhaust manifold 22 increases, there is a corresponding decrease in the wavelength of the first emission 26 such that at ambient room temperature the first emission 26 may have a wavelength of between about 50 microns and about 1,000 microns, and at operating temperatures (e.g., greater than about 100° C.) the first emission 26 may have a wavelength of between about 700 nm and about 1,400 nm. It will be understood that the first emission 26 may be a variety of wavelengths at different temperatures of the exhaust manifold 22 such that a variety of temperatures of the exhaust manifold 22 may emit the first emission 26. According to one exemplary embodiment, the exhaust manifold 22 is configured to output the first emission 26 with a wavelength of between about 700 nm and about 1,000 nm while at operating temperature.

Referring now to FIGS. 1 and 2, as explained above, the heat shield 30 is positioned proximate the exhaust manifold 22. The heat shield 30 includes the shield substrate 34 which defines the aperture 38. The shield substrate 34 may include a metal or ceramic material configured to withstand both the high convective heat and the high radiant heat of the first emission 26 from the exhaust manifold 22. Positioned proximate the aperture 38, and defined by the shield substrate 34, are at least one retention feature 84. As explained above, the indicator 42 is positioned over the aperture 38. The support substrate 46 of the indicator 42 defines at least one attachment feature 88 configured to engage the at least one retention feature 84 such that the indicator 42 remains in place over the aperture 38. In the depicted embodiment, the shield substrate 34 defines two retention features and the support substrate defines two attachment features. The attachment features 88, as depicted, may be a snap feature configured to engage a hole embodiment of the retention features 84. It will be understood that the attachment features 88 and retention features 84 may be replaced with other coupling mechanisms such as a latch, adhesives, welding, or other suitable joining techniques.

The support substrate 46 of the indicator 42 may be composed of a material that is at least partially translucent or transparent. For example, the support substrate 46 may include an optically transparent material such as silicone, polyisoprene, polybutadiene, chloroprene, butyl rubber, nitrile rubber, fluorosilicate, fluoroelastomers, ethylene vinyl acetate, other soft polymeric materials and/or combinations thereof. As explained above, the indicium 58 is positioned on the indicator 42. In the depicted embodiment, the indicium 58 is integrally defined by the support substrate 46. The indicium 58 may include a symbol, alpha numeric text, a picture, a number, a combination thereof and/or other information configured to indicate that the exhaust manifold 22 and heat shield 30 are hot and should not be contacted. The support substrate 46 may define one or more discrete indicium 58 (e.g., multiple separate indicia spaced across the support substrate 46). Positioned on the opposite side of the support substrate 46 from the indicium 58 is the semiconductor layer 50. In other words, the semiconductor layer 50 is positioned between the exhaust manifold 22 and the support substrate 46 and the indicium 58. As explained above, the semiconductor layer 50 is configured to absorb the first emission 26 and emit the second emission 54. As the support substrate 46 is formed of an at least translucent material, the second emission 54 may pass through the support substrate 46 thereby illuminating the indicium 58 in a back-lit configuration. As will be explained in greater detail below, the second emission 54 may be of a shorter wavelength (e.g., less than about 800 nm, less than about 700 nm, or visible light) than the first emission 26.

Positioned between the semiconductor layer 50 and the support substrate 46 may be an optional adhesive layer 96. The adhesive layer 96 may be a clear pressure-sensitive adhesive or other substantially translucent or transparent adhesive. It will be understood that the adhesive layer 96 is optional. For example, the semiconductor layer 50 may be molded directly onto the adhesive layer 96 or a mechanical fastening mechanism may be utilized.

As explained above, the semiconductor layer 50 is configured to emit light. According to various embodiments, the semiconductor layer 50 may be configured to emit light in response to receiving an excitation emission (e.g., the first emission 26). The semiconductor layer 50 may include a binder 50A and a photoluminescent semiconductor material 50B. The binder 50A may be an optically transparent or translucent material such as polymethylmethacrylate, nylon, polycarbonate, polyester and/or polyvinyl chloride can also be used. The binder 50A is configured to suspend the photoluminescent semiconductor material 50B. The photoluminescent semiconductor material 50B may include one or more quantum dots. Quantum dots are nanoscale semiconductor devices that tightly confine either electrons or electron holes in all three spatial dimensions and may be photoluminescent. The photoluminescence of a quantum dot can be manipulated to specific wavelengths by controlling the particle diameter of the quantum dots. Quantum dots may have a radius, or a distance half of their longest length, in the range of between about 1 nm and about 10 nm, or between about 2 nm and about 6 nm. Larger quantum dots (e.g., radius of 5-6 nm) emit longer wavelength light resulting in the color of the light being such colors as orange or red. Smaller quantum dots (e.g., radius of 2-3 nm) emit shorter wavelengths resulting in colors such as blue and green. It will be understood that the wavelength of light emitted from the quantum dots may vary depending on the exact composition of the quantum dots. Quantum dots naturally produce monochromatic light. Exemplary compositions of the quantum dots include $LaF_3$ quantum dot nanocrystals that are doped (e.g., coated) with Yb—Er, Yb—Ho and/or Yb—Tm. Other types of quantum dots that can be used include various types of tetrapod quantum dots and perovskite-enhanced quantum dots. It will be understood that one or more types of quantum dots may be mixed or otherwise used in the semiconductor layer 50.

The quantum dot embodiments of the photoluminescent semiconductor material 50B may be configured to emit light (e.g., the second emission 54) in response to an excitation emission. According to various embodiments, the quantum dots may be configured to emit light by up-converting excitation light. Up-conversion works by absorbing two or more photons of a longer wavelength excitation emission. Once absorbed, the quantum dots may emit one or more photons having a shorter wavelength than the wavelengths of the excitation emission. According to various embodiments, the excitation emission may be infrared light. In such embodiments, the excitation emission (e.g., the first emission 26) may have a wavelength of between about 800 nm and about 1000 nm. In a specific embodiment, the excitation emission may have a wavelength of about 980 nm. A 980 nm wavelength is chosen since red, blue and green emitting colloidal quantum dots of these species can efficiently absorb this wavelength of light. This means the semiconductor layer 50 can emit virtually any color including white, except shades of purple, when charged or excited with infrared light and the proper sized quantum dots are used. It will be understood that quantum dots of different sizes and compositions may be mixed in order to create different lighting colors.

According to various embodiments, the semiconductor layer 50 may be structurally formed as a film. In a first method of forming the semiconductor layer 50, the photoluminescent semiconductor material 50B may be blended directly into the binder 50A. Next, the mixture of semiconductor material 50B and binder 50A may be extruded into a thin sheet of film. Another exemplary method of producing the semiconductor layer 50 is to apply a thin coating of the semiconductor material 50B to a surface. To do this, the semiconductor material 50B is first blended into a polymer or a polymerizable mixture of monomers. Next, the mixture is then spin coated, ink jetted or otherwise applied as a thin layer over a surface (e.g., of a film, substrate or vehicle component). Monomer mixtures can be polymerized (cured) on the surface after application. Using this approach, it may be important to assure that the polymer or monomer mixture is lipophilic (non-polar) if organic soluble semiconductor material 50B is being used. Conversely, if water-soluble photoluminescent semiconductor material 50B is being used, the polymer or monomers may be hydrophilic (water soluble).

Positioned on an opposite side of the semiconductor layer 50 than the support substrate 46 is a stability layer 100. The stability layer 100 may be polymeric or other coating configured to protect the semiconductor layer 50 from environmental damage (e.g., due to dirt, moisture, debris, access heat) during operation of the engine 18. The stability layer 100 may be composed of silicone, polyisoprene, polybutadiene, chloroprene, butyl rubber, nitrile rubber, fluorosilicate, fluoroelastomers, ethylene vinyl acetate, other soft polymeric materials and/or combinations thereof.

Use of the present disclosure may offer a variety of advantages. First, use of the semiconductor layer 50 in conjunction with the indicator 42 and the indicium 58 creates a passively illuminating warning for the heat shield 30 which does not require power. As explained above, the first emission 26 is of a sufficiently low wavelength to function as an excitation source for the photoluminescent semiconductor material 50B. Further, as the photoluminescent semiconductor material 50B converts the first emission 26 into the second emission 54 which is of a visible wavelength, indicium 58 may be passively illuminated. Second, the use of the indicator 42 with the attachment features 88 and the heat shield 30 with the retention features 84, allows for the quick assembly of the indicator 42 onto the heat shield 30. Third, use of existing structures which are heated as an excitation source allows for a decrease in the complexity of an illuminated indicator 42. Fourth, the indicator 42 may be used in conjunction with other engine components (e.g., engine block, cylinder head, etc.) which reach a sufficient temperature to emit a radiative emission with the sufficient wavelength.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovation have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicle engine, comprising:
    an exhaust manifold configured to emit a first emission wavelength;
    a heat shield positioned to a side of and at a distance from; the exhaust manifold having a shield substrate defining an aperture; and
    an indicator positioned over the aperture and comprising:
        a support substrate; and
        a semiconductor layer configured to absorb the first emission wavelength and emit a second emission wavelength wherein the exhaust manifold and the indicator are separated only by ambient air.

2. The vehicle engine of claim 1, wherein the support substrate defines an indicium positioned to be illuminated by the second emission wavelength.

3. The vehicle engine of claim 1, wherein the semiconductor layer is positioned between the support substrate and the exhaust manifold.

4. The vehicle engine of claim 1, wherein the support substrate defines an attachment feature and the shield substrate defines a retention feature configured to engage the attachment feature.

5. The vehicle engine of claim 1, wherein the support substrate is substantially transparent.

6. The vehicle engine of claim 1, wherein the semiconductor layer comprises a plurality of quantum dots.

7. The vehicle engine of claim 1, wherein the support substrate comprises silicone.

8. The vehicle engine of claim 6, wherein the plurality of quantum dots are suspended in polymethylmethacrylate.

9. A vehicle, comprising:
    an engine component configured to emit a first emission having a wavelength greater than about 800 nm;
    a heat shield positioned to a side of and at a distance from; the engine component; and
    an indicator positioned on the heat shield configured to absorb the first emission and emit a second emission wherein the engine component and the indicator are separated only by ambient air.

10. The vehicle of claim 9, wherein the first emission has a longer wavelength than the second emission.

11. The vehicle of claim 9, wherein the indicator defines an indicium configured to be illuminated by the second emission.

12. The vehicle of claim 9, wherein the heat shield defines an aperture over which the indicator is positioned.

13. The vehicle of claim 9, wherein the engine component is an exhaust manifold.

14. The vehicle of claim 12, wherein the indicator comprises a plurality of quantum dots.

15. The vehicle of claim 14, wherein the indicator comprises silicone.

16. A vehicle engine, comprising:
    an exhaust manifold configured to emit a first emission;
    a heat shield positioned to a side of and at a distance from; the exhaust manifold; and
    a semiconductor layer positioned proximate the heat shield and configured to convert the first emission into a second emission wherein the semiconductor layer and the exhaust manifold are separated only by ambient air.

17. The vehicle of claim 16, wherein the first emission has a longer wavelength than the second emission.

18. The vehicle of claim 17, wherein the second emission has a wavelength of less than about 800 nm.

19. The vehicle of claim 18, wherein the semiconductor layer is positioned on a support substrate defining an indicium.

20. The vehicle of claim 19, wherein the indicium is illuminated by the second emission.

* * * * *